Jan. 10, 1928.

L. F. DIERICKX 1,655,457

COMBINATION PLOW AND SOIL AGITATOR

Filed Jan. 8, 1926

INVENTOR.
LAWRENCE F. DIERICKX
BY
ATTORNEY.

Patented Jan. 10, 1928.

1,655,457

UNITED STATES PATENT OFFICE.

LAWRENCE F. DIERICKX, OF GROSSE POINTE, MICHIGAN.

COMBINATION PLOW AND SOIL AGITATOR.

Application filed January 8, 1926. Serial No. 79,964.

My invention relates to a new and useful improvement in a combination plow and soil agitator and has for its object the provision of a device of this class which will be simple in structure, economical of manufacture, and highly efficient in use.

Another object of the present invention is the provision of a device for plowing the earth, raising it to an elevation, thoroughly disintegrating it and depositing it in a finely pulverized condition in its former position.

Another object of the invention is the provision of a digging element adapted for projecting into the ground for removing it from its position and conducting it to a conveyor which in turn conducts it to a pair of co-operating rotatable pulverizers.

Another object of the present invention is the provision of a device of this class which may be adjusted vertically at its front end for accommodating the device to various conditions.

Other objects will appear hereinafter.

The invention consists in the combination and arrangement of parts hereinafter described and claimed.

The invention will be best understood from a reference to the accompanying drawings, which form a part of this specification and in which Fig. 1 is a top plan view of the invention.

Figure 1:
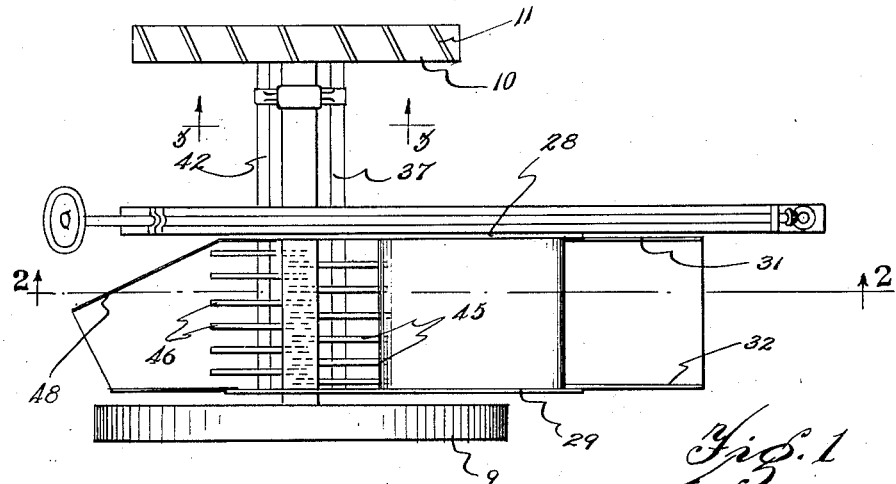
Figure 2:
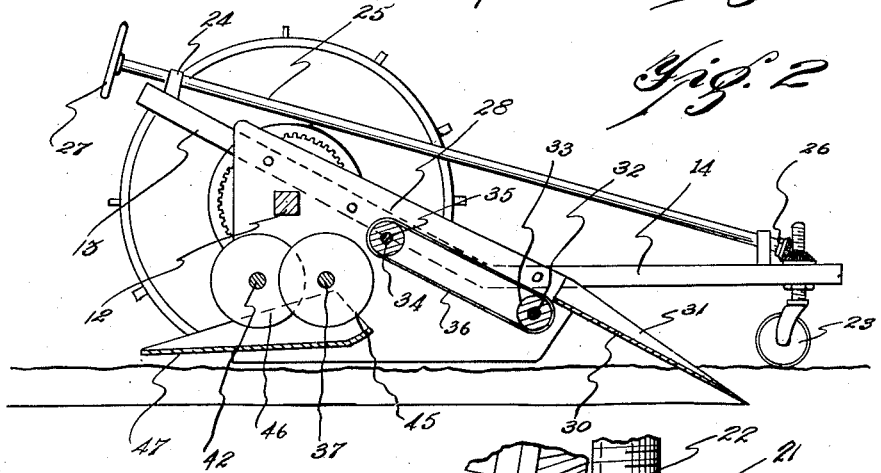
Fig. 2 is a sectional view taken on substantially line 2—2 of Fig. 1.
Figure 3:
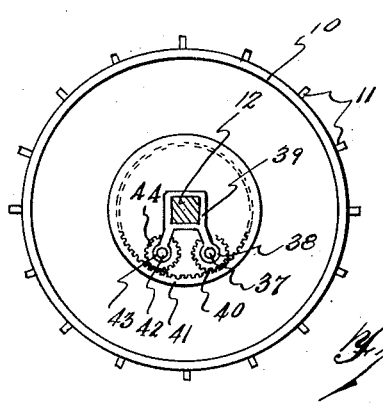
Fig. 3 is a sectional view taken on substantially line 3—3 of Fig. 1.
Figure 4:
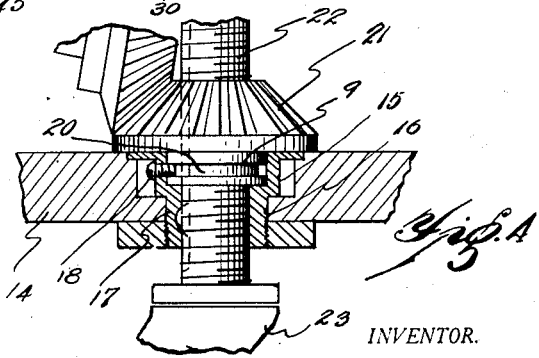
Fig. 4 is an enlarged fragmentary view showing the adjusting mechanism—parts being shown in section.

As shown in the drawings the device is mounted upon a pair of wheels 9 and 10— the wheel 10 being provided on its periphery with gripping members 11—this wheel 10 serving as a traction wheel.

In the use of the device it is desirable that the wheel 9 ride in the furrow and for this reason the wheel 9 is generally made of slightly greater diameter than the wheel 10. These wheels are rotatably mounted upon the axle 12. Extending diagonally of the axle 12 is a supporting beam 13 which is angularly turned to provide the horizontally extending forwardly positioned portion 14. This horizontally extending forwardly positioned portion 14 is provided adjacent its end with an opening 15, which is reduced as at 16. Positioned in the openings 15 and 16 is a bushing 17 through which is projected the set screw 18 adapted to engage in the groove 19 which projects outwardly from the beveled gear 21. This beveled gear being provided with an interior threaded bore for the reception of the threaded stem 22 upon which is swivelly mounted the castor 23. Mounted on the diagonally extending portion 13 of the beam adjacent the rear end thereof is a bearing 24 in which is rotatably mounted a forwardly extending diagonally directed rod 25. Mounted on the forward end of the rod 25 is a beveled gear 26 adapted to mesh with the beveled gear 21 so that upon a rotation of the rod 25 by means of the hand wheel 27—which is mounted fixedly upon its rear end the stem 22 may be moved vertically of the portion 14 of the beam so as to adjust the vertical position of the castor 23 relatively to the beam 14. Riveted or otherwise suitably secured to the diagonally extending portion 13 of the beam is a side plate 28 which is preferably made of metal and shaped to form a trapezium. A similarly shaped plate 29 is mounted in spaced relation to the plate 28—the axle 12 being projected through these plates. Mounted upon the plates 28 and 29 at the forward end thereof adjacent the upper edge is a digging element 30 having outwardly extending flanges 31 and 32 at the opposite sides so as to guide the earth which is dug by the digging element 30 that it may travel rearwardly of the digging element—this digging element being rearwardly upwardly inclined. Journaled in the plates 28 and 29 at its opposite ends is a shaft 32 upon which is fixedly mounted a roller 33. A similar shaft 34 is journaled in the plates 28 and 29 in a similar manner. Fixedly mounted upon the shaft 34 is a roller 35. Positioned around the rollers 33 and 35 is an endless conveyor 36.

It will be noted that the roller 33 is positioned slightly rearwardly of the rear end of the digging element 30 and slightly below it so that the earth being forced rearwardly of the digging element serves to plow the earth, will pass from the digging element to the conveyor and as the plowing proceeds more earth travels over the digging element 30, the conveyor will be caused to move in response to the rearward pressure exerted on its upper end, thus carrying the earth to the rearward end of the conveyor 36.

Extending parallel to the axle 12 is an axle 37 which is journalled at one end in the plate 29 and at the opposite end in a suitable arm 38 which depends from a bracket 39 mounted upon the axle 12. Fixedly mounted upon the shaft 37 is a pinion 40 in mesh with the inner teeth of a ring gear 41. A similar shaft 42 is similarly journalled in the plate 29 and in the bearing provided by the depending arm 43. Fixedly mounted upon the shaft 42 is a pinion 44 meshing also with the inner teeth of the ring gear 41. Fixedly mounted upon the shaft 37 intermediate the plates 28 and 29 are discs or disintegrating members 45 which are staggered relatively to and overlapping the similar discs or disintegrating members 46 which are fixedly mounted between the plates 28 and 29 upon the shaft 42.

It is evident that when the device is used for plowing the stem 22 is so adjusted that the digging element 30 may enter the earth over which it is drawn—this earth will be forced rearwardly over the conveyor 36 and deposited upon the disintegraters 45. These disintegraters will serve to carry the earth into contact with the disintegraters 46 and on account of their rotation in the same direction and their overlapping relation the earth will be thoroughly pulverized while suspended in the air and directed rearwardly.

As the earth in its disintegrated form falls from the disintegraters 45 and 46 it is deposited upon a guide plate 47 which has the flange 48 upwardly directed and angularly turned to the path of travel of the device so that the earth is deflected to fall into the furrow in which the wheel 9 rides.

With devices of this kind it becomes possible to plow fields thoroughly and eliminate to a great extent all need for harrowing and the pulverizing of the earth is more efficiently accomplished than in a harrowing process. Moreover the structure of the invention is believed to be one of simplicity while at the same time durable to withstand the wear to which it is subjected.

When it is desired to move the device over the ground without effecting a plowing of the earth passed over the adjustment of the stem 22 relatively to the portion 14 of the beam may be such as to raise the digging element 30 clear of the ground. This adjusting feature also is important where it is desired to regulate the depth of the plowing and in making turns it may sometimes be necessary to raise the digging element clear of the ground to make the turn. The structure which I have provided has proved quite efficient for this purpose and it is believed quite simple in structure.

While I have illustrated and described the preferred form of structure, I do not wish to limit myself to the precise forms of structure shown, but desire to avail myself of such variations and modifications as come within the scope of the appended claims.

Having thus described my invention what I claim as new and desire to secure by Letters Patent is:

1. A device of the class described, comprising a supporting axle; a pair of wheels rotatably mounted on said axle, one of said wheels being larger than the other, the smaller of said wheels being a traction wheel; a supporting beam extending diagonally of said axle for a portion of its length and angularly turned throughout the remainder of its length to extend horizontally; side plates mounted on said axle, one of said plates being attached to said beam; a digging member mounted on the forward end of said side plates intermediate the same; a pair of rollers mounted between said plates; a conveyor rotatably mounted on said rollers and adapted for receiving the earth raised by said digging element for conveying the same rearwardly, a pair of rotatable disintegrating members positioned behind the rear end of said conveyor for disintegrating the earth deposited from said conveyor; and a deflecting member rearwardly of said disintegrating members for deflecting said earth to one side after passage from said disintegrating members.

2. A device of the class described, comprising: a supporting axle; a pair of wheels rotatably mounted on said axle; a supporting beam extending diagonally of said axle for a portion of its length and angularly turned throughout the remainder of its length to extend horizontally, said beam projecting outwardly substantially at the medial line of said axle; side plates mounted on said axle at one side of said beam; a digging member mounted on the forward end of said side plates, intermediate the same; a conveyor for conveying earth dug by said digging member rearwardly therefrom; disintegrating members mounted rearwardly and below said conveyor for disintegrating earth deposited on the same on said conveyor; and a deflecting member extending rearwardly of said disintegrating members for deflecting the disintegrated earth angularly of the path of travel of said device.

In testimony whereof, I have signed the foregoing.

LAWRENCE F. DIERICKX.